(12) United States Patent
Kim et al.

(10) Patent No.: US 11,969,707 B2
(45) Date of Patent: Apr. 30, 2024

(54) METHOD FOR PREPARING SUPER ABSORBENT POLYMER

(71) Applicant: LG Chem, Ltd., Seoul (KR)

(72) Inventors: Jaeyul Kim, Daejeon (KR); Jong Hun Song, Daejeon (KR); Gicheul Kim, Daejeon (KR); Yoon Jae Min, Daejeon (KR); Ki Hyun Kim, Daejeon (KR); Seul Ah Lee, Daejeon (KR); In Yong Jeong, Daejeon (KR); Heechang Woo, Daejeon (KR)

(73) Assignee: LG Chem, Ltd., Seoul (KR)

( * ) Notice: Subject to any disclaimer, the term of this patent is extended or adjusted under 35 U.S.C. 154(b) by 834 days.

(21) Appl. No.: 17/045,025

(22) PCT Filed: Nov. 8, 2019

(86) PCT No.: PCT/KR2019/015196
§ 371 (c)(1),
(2) Date: Oct. 2, 2020

(87) PCT Pub. No.: WO2020/101287
PCT Pub. Date: May 22, 2020

(65) Prior Publication Data
US 2021/0146336 A1 May 20, 2021

(30) Foreign Application Priority Data

Nov. 13, 2018 (KR) ........................ 10-2018-0139106
Dec. 3, 2018 (KR) ........................ 10-2018-0153909
Dec. 18, 2018 (KR) ........................ 10-2018-0164466

(51) Int. Cl.
| | | |
|---|---|---|
| B01J 20/26 | (2006.01) | |
| C08F 2/48 | (2006.01) | |
| C08F 120/06 | (2006.01) | |
| C08F 222/10 | (2006.01) | |
| C08J 9/14 | (2006.01) | |
| C08J 9/16 | (2006.01) | |
| C08K 9/10 | (2006.01) | |

(52) U.S. Cl.
CPC ........... B01J 20/261 (2013.01); B01J 20/267 (2013.01); C08F 2/48 (2013.01); C08F 120/06 (2013.01); C08F 222/102 (2020.02); C08J 9/14 (2013.01); C08J 9/16 (2013.01); C08K 9/10 (2013.01); B01J 2220/68 (2013.01); C08J 2203/14 (2013.01); C08J 2333/02 (2013.01); C08K 2201/003 (2013.01)

(58) Field of Classification Search
CPC .... B01J 20/261; B01J 20/267; B01J 2220/68; C08F 2/48; C08F 120/06; C08F 220/02; C08F 222/102; C08J 9/14; C08J 9/16; C08J 9/32; C08J 3/075; C08J 3/12; C08J 3/24; C08J 3/245; C08J 2203/14; C08J 2203/22; C08J 2333/02; C08J 2201/026; C08J 2205/022; C08J 2207/12; C08K 9/10; C08K 2201/003
See application file for complete search history.

(56) References Cited

U.S. PATENT DOCUMENTS

| | | | |
|---|---|---|---|
| 6,274,231 B1 | 8/2001 | Weerkamp | |
| 10,814,307 B2 * | 10/2020 | Heo ...................... | B01J 20/267 |
| 2005/0137546 A1 | 6/2005 | Joy et al. | |
| 2007/0088093 A1 | 4/2007 | Joy et al. | |
| 2008/0214749 A1 | 9/2008 | Weismantel et al. | |
| 2010/0100066 A1 | 4/2010 | Azad et al. | |
| 2012/0001122 A1 | 1/2012 | Wattebled et al. | |
| 2012/0016084 A1 | 1/2012 | Dairoku et al. | |
| 2012/0271260 A1 | 10/2012 | Azad et al. | |
| 2012/0296297 A1 | 11/2012 | Di Cintio et al. | |
| 2014/0193641 A1 | 7/2014 | Torii et al. | |
| 2014/0312273 A1 | 10/2014 | Wattebled et al. | |
| 2015/0157759 A1 | 6/2015 | Azad et al. | |
| 2016/0030921 A1 * | 2/2016 | Ryu ..................... | B01J 20/3028 522/182 |
| 2017/0226248 A1 | 8/2017 | Kim et al. | |
| 2017/0354952 A1 | 12/2017 | Kim et al. | |
| 2018/0037686 A1 * | 2/2018 | Lee ........................... | C08J 3/12 |
| 2018/0043332 A1 | 2/2018 | Lee et al. | |
| 2018/0228671 A1 | 8/2018 | Hwang et al. | |
| 2019/0077924 A1 | 3/2019 | Lee et al. | |
| 2019/0134603 A1 | 5/2019 | Kim et al. | |
| 2019/0308170 A1 * | 10/2019 | Heo ........................ | C08K 5/06 |
| 2020/0164344 A1 | 5/2020 | Kim et al. | |
| 2020/0188876 A1 | 6/2020 | Kim et al. | |
| 2021/0301040 A1 | 9/2021 | Hartnagel et al. | |

FOREIGN PATENT DOCUMENTS

| | | |
|---|---|---|
| CN | 102361653 A | 2/2012 |
| CN | 107207745 A | 9/2017 |

(Continued)

OTHER PUBLICATIONS

Search Report for European Application No. 19885400.2 dated Sep. 24, 2021.3 pgs.

(Continued)

Primary Examiner — Brian A McCaig
(74) Attorney, Agent, or Firm — Lerner David LLP

(57) ABSTRACT

The method for preparing a super absorbent polymer according to the present disclosure has a feature that it is possible to reduce the generation of a fine powder during production of the super absorbent polymer while maintaining excellent physical properties of the super absorbent polymer, including centrifuge retention capacity (CRC) and vortex removal time.

12 Claims, No Drawings

(56) References Cited

FOREIGN PATENT DOCUMENTS

| | | | |
|---|---|---|---|
| CN | 107922637 A | 4/2018 |
| EP | 0289338 A2 | 11/1988 |
| EP | 0574248 A2 | 12/1993 |
| EP | 0644207 A1 | 3/1995 |
| EP | 0920469 A1 | 6/1999 |
| EP | 1130045 A2 | 9/2001 |
| EP | 1002806 B1 | 3/2005 |
| EP | 2578318 A2 | 4/2013 |
| JP | 2003062460 A | 3/2003 |
| JP | 2003137922 A | 5/2003 |
| JP | 2005200630 A | 7/2005 |
| JP | 2007514833 A | 6/2007 |
| JP | 2010053296 A | 3/2010 |
| JP | 2012505940 A | 3/2012 |
| JP | 2012522880 A | 9/2012 |
| JP | 5336704 B2 | 11/2013 |
| JP | 2014514128 A | 6/2014 |
| JP | 5631866 B2 | 11/2014 |
| JP | 2015048386 A | 3/2015 |
| JP | 2016056353 A | 4/2016 |
| KR | 20110009580 A | 1/2011 |
| KR | 20140038998 A | 3/2014 |
| KR | 20140094536 A | 7/2014 |
| KR | 20150059454 A | 6/2015 |
| KR | 20160041826 A | 4/2016 |
| KR | 20160149236 A | 12/2016 |
| KR | 20160149237 A | 12/2016 |
| KR | 20170002468 A | 1/2017 |
| KR | 20170002470 A | 1/2017 |
| KR | 20170075624 A | 7/2017 |
| KR | 20180071852 A | 6/2018 |
| KR | 20180076272 A | 7/2018 |
| KR | 20180087049 A | 8/2018 |
| KR | 20190026354 A | 3/2019 |
| KR | 20190026355 A | 3/2019 |
| WO | 2014021388 A1 | 2/2014 |
| WO | 2015163510 A1 | 10/2015 |
| WO | 2015163512 A1 | 10/2015 |
| WO | 2015163522 A1 | 10/2015 |
| WO | 2018029045 A1 | 2/2018 |
| WO | WO-2018110759 A1 * | 6/2018 | ............ B01J 20/267 |

OTHER PUBLICATIONS

Search report from International Application No. PCT/KR2019/015196, dated Mar. 3, 2020.
Schwalm, UV Coatings; Basics, Recent Developments and New Applications, Dec. 21, 2006, p. 115, Elsevier Science.
Odian, Principles of Polymerization, Second Edition, Copyright 1981 by John Wiley & Sons, Inc., p. 203.
Buchholz, Fredric L et al., Modern Superabsorbent Polymer Technology, Nov. 1997, 12 Pages, John Wiley & Sons, Inc.
Third Party Observation for PCT/KR2019/015196 submitted Feb. 22, 2021.
Search Report dated Apr. 18, 2022 from Office Action for Chinese Application No. 201980022665.3 dated Apr. 24, 2022. 3 pgs.

* cited by examiner

METHOD FOR PREPARING SUPER ABSORBENT POLYMER

CROSS-REFERENCE TO RELATED APPLICATIONS

The present application is a national phase entry under 35 U.S.C. § 371 of International Application No. PCT/KR2019/015196, filed on Nov. 8, 2019, which claims priority to Korean Patent Application No. 10-2018-0139106, filed on Nov. 13, 2018, Korean Patent Application No. 10-2018-0153909, filed on Dec. 3, 2018, and Korean Patent Application No. 10-2018-0164466, filed on Dec. 18, 2018, the disclosures of which are incorporated herein by reference in their entity.

TECHNICAL FIELD

The present disclosure relates to a method for preparing a super absorbent polymer capable of reducing the generation of a fine powder.

BACKGROUND OF ART

Super absorbent polymer (SAP) is a synthetic polymer material capable of absorbing moisture from about 500 to about 1,000 times its own weight, and each manufacturer has denominated it as different names such as SAM (Super Absorbency Material), AGM (Absorbent Gel Material) or the like. Such a super absorbent polymer started to be practically applied in sanitary products, and now they are widely used for production of hygiene products such as paper diapers for children or sanitary napkins, water retaining soil products for gardening, water stop materials for the civil engineering and construction, sheets for raising seedling, fresh-keeping agents for food distribution fields, materials for poultice or the like.

In most cases, these super absorbent polymers have been widely used in the field of sanitary materials such as diapers or sanitary napkins. In such hygienic materials, the super absorbent polymer is generally contained in a state of being spread in the pulp. In recent years, however, continuous efforts have been made to provide hygienic materials such as diapers having a thinner thickness. As a part of such efforts, the development of so-called pulpless diapers and the like in which the content of pulp is reduced or pulp is not used at all is being actively advanced.

As described above, in the case of hygienic materials in which the pulp content is reduced or the pulp is not used, a super absorbent polymer is contained at a relatively high ratio and these super absorbent polymer particles are inevitably contained in multiple layers in the hygienic materials. In order for the whole super absorbent polymer particles contained in the multiple layers to absorb liquid such as urine more efficiently, the super absorbent polymer needs to basically exhibit high absorption capacity and absorption rate.

In particular, a super absorbent polymer having an increased surface area has been prepared to exhibit a fast absorption rate. The surface area is increased and the structural strength of the super absorbent polymer is weak, so a lot of fine powder is generated in the coarse pulverizing process. Fine powder not only deteriorates the working environment, but also has a problem in that the process load is increased due to the recycling process of fine powder. Thereby, there is a need for a preparation method capable of reducing the generation of a fine powder while maintaining the physical properties of the super absorbent polymer.

DETAILED DESCRIPTION OF THE INVENTION

Technical Problem

It is an object of the present disclosure to provide a method for preparing a super absorbent polymer capable of reducing the generation of a fine powder while maintaining excellent physical properties of the super absorbent polymer.

Technical Solution

In order to achieve the above object, one aspect of the present disclosure provides a method for preparing a super absorbent polymer including the following steps:

A method for preparing a super absorbent polymer including the steps of:

performing crosslinking polymerization of a water-soluble ethylenically unsaturated monomer having an acidic group of which at least a part is neutralized, in the presence of an internal crosslinking agent and a polymerization initiator to form a hydrogel polymer containing a first crosslinked polymer (step 1);

drying the hydrogel polymer so that a water content of the polymer is 2 to 10 wt % (step 2); and pulverizing the dried polymer (step 3), wherein the internal crosslinking agent is used in an amount of 500 to 2500 ppmw based on the weight of the water-soluble ethylenically unsaturated monomer having an acidic group of which at least a part is neutralized.

The method for preparing a super absorbent polymer largely includes a step of polymerizing a water-soluble ethylenically unsaturated monomer to prepare a hydrogel polymer, and a step of drying the polymer and then pulverizing it. In order to maximize the properties of the super absorbent polymer, it must be prepared in the form of particles, and in particular, when prepared in the form of particles having a diameter of 150 μm to 850 μm (or, 180 to 850 μm, or 300 to 850 μm), the properties as a super absorbent polymer are sufficiently exhibited and thus, a pulverizing step is essentially required.

By the way, when the hydrogel polymer is pulverized in order to pulverize in the above diameter range, particles having a diameter of 150 μm or less (or 180 μm or less) are prepared, which is generally called 'fine powder'. First, there is a problem that the fine powder is scattered in the production process. In addition, since the fine powder is not simply discarded, but is recycled by adding water to the fine powder, re-assembling and again pulverizing it, there is a problem that as the amount of fine powder generated increases, the process load increases.

Thus, the characteristic of the present disclosure resides in relatively increasing the water content by controlling the drying conditions before pulverization of the hydrogel polymer, so that the amount of the fine powder generated during pulverization of the hydrogel polymer can be reduced, as described below. However, when the water content is increased, there is a problem that among the properties of the super absorbent polymer, in particular, CRC is lowered. In order to complement this problem, it is possible to prevent the CRC from being decreased by controlling the amount of the internal crosslinking agent used in the preparation of the hydrogel polymer.

Hereinafter, the present disclosure will be described in detail for each step.

(Step 1)

Step 1 is a step of forming a hydrogel polymer, which is a step of performing a crosslinking polymerization of a monomer composition containing an internal crosslinking agent, a polymerization initiator, and a water-soluble ethylenically unsaturated monomer having an acidic group of which at least a part is neutralized.

The water-soluble ethylenically unsaturated monomer constituting the first crosslinked polymer may be any monomer commonly used for the preparation of a super absorbent polymer. As a non-limiting example, the water-soluble ethylenically unsaturated monomer may be a compound represented by the following Chemical Formula 1:

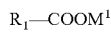  [Chemical Formula 1]

in the Chemical Formula 1, $R_1$ is an alkyl group having 2 to 5 carbon atoms containing an unsaturated bond, and $M^1$ is a hydrogen atom, a monovalent or divalent metal, an ammonium group or an organic amine salt.

Preferably, the monomer may be one or more selected from the group consisting of acrylic acid, methacrylic acid, and monovalent metal salts, divalent metal salts, ammonium salts, and organic amine salts of these acids. When an acrylic acid or a salt thereof is used as the water-soluble ethylenically unsaturated monomer in this way, it is advantageous in that a super absorbent polymer having improved water absorptivity is obtained. In addition, as the monomer, maleic anhydride, fumaric acid, crotonic acid, itaconic acid, 2-acryloyl ethane sulfonic acid, 2-methacryloyl ethane sulfonic acid, 2-(meth)acryloyl propane sulfonic acid, or 2-(meth)acrylamide-2-methylpropane sulfonic acid, (meth)acrylamide, N-substituted (meth)acrylate, 2-hydroxyethyl(meth)acrylate, 2-hydroxypropyl(meth)acrylate, methoxypolyethyleneglycol(meth)acrylate, polyethyleneglycol(meth)acrylate, (N,N)-dimethylaminoethyl(meth)acrylate, (N,N)-dimethylaminopropyl(meth)acrylamide, and the like may be used.

Here, the water-soluble ethylenically unsaturated monomer may be those having an acidic group of which at least a part is neutralized. Preferably, the monomer may be those in which the monomer is partially neutralized with an alkaline substance such as sodium hydroxide, potassium hydroxide, ammonium hydroxide or the like.

In this case, the degree of neutralization of the monomer may be 40 to 95 mol %, or 40 to 80 mol %, or 45 to 75 mol %. The range of the degree of neutralization may vary depending on the final physical properties. An excessively high degree of neutralization causes the neutralized monomers to be precipitated, and thus polymerization may not readily occur, whereas an excessively low degree of neutralization not only greatly deteriorates the absorbency of the polymer but also endows the polymer with hard-to-handle properties, like elastic rubber.

In addition, the concentration of the water-soluble ethylenically unsaturated monomer in the monomer composition may be properly controlled in consideration of the polymerization time and reaction conditions, and the concentration may be preferably 20 to 90% by weight, or 40 to 65% by weight. These concentration ranges may be advantageous for adjusting the pulverization efficiency during pulverization of the polymer described below, without needing to remove unreacted monomers after polymerization by using the phenomenon of gel effect occurring in the polymerization reaction of the highly concentrated aqueous solution.

However, when the concentration of the monomer is excessively low, the yield of the super absorbent polymer may be lowered. On the contrary, when the concentration of the monomer is excessively high, it may arise problems processes, for example, a part of the monomers may be precipitated, or the pulverization efficiency may be lowered during pulverization of the polymerized hydrogel polymer, etc., and the physical properties of the super absorbent polymer may be deteriorated.

Further, as the internal crosslinking agent, any compound can be used as long as it enables introduction of a crosslink bond upon polymerization of the water-soluble ethylenically unsaturated monomer. Non-limiting examples thereof may include multifunctional crosslinking agents, such as ethylene glycol diglycidyl ether, N,N'-methylenebisacrylamide, trimethylolpropane tri(meth)acrylate, polyethylene glycol diacrylate, ethylene glycol di(meth)acrylate, polyethylene glycol(meth)acrylate, polyethylene glycol di(meth)acrylate, polypropylene glycol (meth)acrylate, butanediol di(meth)acrylate, butylene glycol di(meth)acrylate, diethylene glycol di(meth)acrylate, hexanediol di(meth)acrylate, triethylene glycol di(meth)acrylate, tripropylene glycol di(meth)acrylate, tetraethylene glycol di(meth)acrylate, dipentaerythritol pentacrylate, glycerin tri(meth)acrylate, pentaerythritol tetraacrylate, triarylamine, propylene glycol, glycerin, or ethylene carbonate, which may be used alone or in combination of two or more thereof, but are not limited thereto. Preferably, ethylene glycol diglycidyl ether is used, or polyethylene glycol diacrylate is used together therewith.

The internal crosslinking agent is used in an amount of 500 to 2500 ppmw based on the weight of the water-soluble ethylenically unsaturated monomer having an acidic group of which at least a part is neutralized. As will be described later, the present disclosure has a feature that the water content is relatively high when drying the hydrogel polymer, and there is a problem that the CRC among the properties of the super absorbent polymer is low because the water content is high. However, this problem is complemented by using a relatively small amount of the internal crosslinking agent as described above. When the amount of the internal crosslinking agent is less than 500 ppmw, the concentration of the internal crosslinking agent is too low and thus, the absorption rate of the super absorbent polymer is lowered and the gel strength may be weakened, which is not preferable. On the contrary, when the content of the internal cross-linking agent is higher than 2500 ppmw, the concentration of the internal crosslinking agent is too high and thus, the absorption capacity of the super absorbent polymer is lowered, which is not preferred for an absorber. Preferably, the internal crosslinking agent is used in an amount of 600 ppmw or more, 700 ppmw or more, or 800 ppmw or more; and 2400 ppmw or less, 2300 ppmw or less, 2200 ppmw or less, 2100 ppmw or less, 2000 ppmw or less, 1900 ppmw or less, 1800 ppmw or less, 1700 ppmw or less, 1600 ppmw or less, 1500 ppmw or less, 1400 ppmw or less, or 1300 ppmw or less, based on the weight of the water-soluble ethylenically unsaturated monomer having an acidic group in which at least a portion is neutralized.

Further, in step 1, a polymerization initiator commonly used for the preparation of a super absorbent polymer can be included. As a non-limiting example, the polymerization initiator may be a thermal polymerization initiator or a photo-polymerization initiator, depending on a polymerization method, and in particular, the thermal polymerization initiator may be used. However, even in the case of performing the photo-polymerization method, a certain amount of heat is generated by ultraviolet irradiation or the like.

Further, a certain amount of heat may be generated with the progress of exothermic polymerization reaction. Therefore, the thermal polymerization initiator may be further included.

As the thermal polymerization initiator, one or more compounds selected from the group consisting of a persulfate-based initiator, an azo-based initiator, hydrogen peroxide, and ascorbic acid may be used. Specific examples of the persulfate-based initiator may include sodium persulfate ($Na_2S_2O_8$), potassium persulfate ($K_2S_2O_8$), ammonium persulfate ($NH_4)_2S_2O_8$), and the like. Further, examples of the azo-based initiator may include 2,2-azobis-(2-amidinopropane)dihydrochloride, 2,2-azobis-(N,N-dimethylene)isobutyramidine dihydrochloride, 2-(carbamoylazo)isobutylonitrile, 2,2-azobis[2-(2-imidazolin-2-yl)propane]dihydrochloride, 4,4-azobis-(4-cyanovaleric acid) and the like. More various thermal polymerization initiators are well disclosed in "Principle of Polymerization" written by Odian, (Wiley, 1981), p 203, which may be incorporated herein by reference. Preferably, ascorbic acid and potassium persulfate are used as the thermal polymerization initiator.

The photo-polymerization initiator may be, for example, one or more compounds selected from the group consisting of benzoin ether, dialkyl acetophenone, hydroxyl alkylketone, phenyl glyoxylate, benzyl dimethyl ketal, acyl phosphine and α-aminoketone. As the specific example of acyl phosphine, commercially available Lucirin TPO, namely, 2,4,6-trimethyl-benzoyl-trimethyl phosphine oxide, may be used. More various photo-polymerization initiators are well disclosed in "UV Coatings: Basics, Recent Developments and New Applications" written by Reinhold Schwalm, (Elsevier, 2007), p 115, which may be incorporated herein by reference.

Such polymerization initiator may be added at a concentration of about 0.001 to 1% by weight, based on the weight of the water-soluble ethylenically unsaturated monomer having an acidic group in which at least a portion is neutralized. That is, if the concentration of the polymerization initiator is too low, the polymerization rate becomes low and a large amount of residual monomers may be extracted from the final product, which is not preferable. On the contrary, if the concentration of the polymerization initiator is higher than the above range, a polymer chain making up a network may become short, and thus, the physical properties of polymer may be degraded such as an increase in the content of water-soluble components (extractable content) and a decrease in absorbency under pressure, which is not preferable.

Further, step 1 may be performed in the presence of a foaming agent. The foaming agent acts to cause foaming during polymerization to form pores in the hydrogel polymer, thereby increasing the surface area. As the foaming agent, an inorganic forming agent, an organic forming agent, or a capsulated foaming agent can be used. As an example of the inorganic foaming agent, sodium bicarbonate, sodium carbonate, potassium bicarbonate, potassium carbonate, calcium bicarbonate, calcium carbonate, magnesium bicarbonate or magnesium carbonate can be mentioned. Further, as an example of the organic foaming agent, azodicarbonamide (ADCA), dinitroso pentamethylene tetramine (DPT), p,p'-oxybisbenzenesulfonylhydrazide (OBSH), and p-toluenesulfonyl hydrazide (TSH) can be mentioned.

Preferably, the foaming agent used may be an encapsulated foaming agent. The encapsulated foaming agent may be adjusted to have an average diameter measured before being expanded, for example, from 5 to 50 μm, from 5 to 30 μm, from 5 to 20 μm, or from 7 to 17 μm, and thus polymer particles in which large pores are uniformly formed can be produced.

The encapsulated foaming agent may have a structure including a core containing hydrocarbon and a shell surrounding the core and formed of a thermoplastic resin. Because such an encapsulated forming agent can be allowed to expand to a desired size, it is used during the preparation of the super absorbent polymer, thereby enabling the super absorbent polymer to control the distribution of pores.

In order to allow the super absorbent polymer to control the distribution of pores, it is necessary to grasp the expansion characteristics of the encapsulated foaming agent. However, since the form in which the foaming agent encapsulated in the super absorbent polymer is foamed may vary depending on the preparation conditions of the super absorbent polymer, it is difficult to define it in one form. Thus, the encapsulated foaming agent is foamed in air to confirm the expansion ratio and size. Specifically, the encapsulated foaming agent is coated onto a glass Petri dish, and then a heat is applied in air for 10 minutes to foam the encapsulated foaming agent. In this case, if the encapsulated foaming agent exhibits a maximum expansion ratio in air of 3 to 15 times, 5 to 15 times, or 8.5 to 10 times, it is suitable as the foaming agent used in the present disclosure.

Further, the encapsulated foaming agent should exhibit the maximum expansion size in air of 600 μm or less, so that it is suitable as the foaming agent used in the present disclosure. Preferably, the encapsulated foaming agent has a maximum expansion size in air of 100 to 590 μm, 150 to 580 μm, 200 to 570 μm, 250 to 570 μm, 300 to 560 μm, or 350 to 550 μm.

The maximum expansion ratio and the maximum expansion size of the encapsulated foaming agent in air are described in detail in Preparation Examples described later.

Further, the encapsulated foaming agent means that the hydrocarbon foaming agent forms a core and the thermoplastic resin forms a shell. The hydrocarbon constituting the core of the encapsulated foaming agent may be at least one selected from the group consisting of n-propane, n-butane, iso-butane, cyclobutane, n-pentane, iso-pentane, cyclopentane, n-hexane, iso-hexane, cyclohexane, n-heptane, iso-heptane, cycloheptane, n-octane, iso-octane, and cyclooctane. Among them, hydrocarbons having 3 to 5 carbon atoms (n-propane, n-butane, iso-butane, cyclobutane, n-pentane, iso-pentane, cyclopentane) are preferred, and iso-butane is more preferred. Further, the thermoplastic resin constituting the shell of the encapsulated foaming agent may be a polymer formed from at least one monomer selected from the group consisting of (meth)acrylate, (meth)acrylonitrile, aromatic vinyl, vinyl acetate, vinyl halide and vinylidene halide. Among them, copolymers of (meth)acrylate and (meth)acrylonitrile are preferred.

The encapsulated foaming agent may contain 10 to 30% by weight of hydrocarbon based on the total weight of the encapsulated foaming agent.

Further, the encapsulated foaming agent is preferably used in an amount of 100 to 1500 ppmw based on the weight of the water-soluble ethylenically unsaturated monomer having an acidic group of which at least a part is neutralized. When the amount of the foaming agent used is less than 100 ppmw, effects due to the use of the foaming agent may be insignificant, and when the amount of the foaming agent used is more than 1500 ppmw, the pores become too large, the gel strength of the super absorbent polymer lowers and the density becomes low, which may cause problems in distribution and storage. More preferably, the foaming agent is used in an amount of 150 ppmw or more, or 200 ppmw or more, 1400 ppmw or less, 1300 ppmw or less, 1200 ppmw or less, 1100 ppmw or less, or 1000 ppmw or less, based on the weight of the water-soluble ethylenically unsaturated monomer having an acidic group of which at least a part is neutralized.

In addition, the monomer composition may further include additives such as a surfactant, a thickener, a plasticizer, a preservation stabilizer, an antioxidant, etc., if necessary.

Such a monomer composition can be prepared in the form of a solution in which raw materials such as the above-mentioned monomer are dissolved in a solvent. In this case, any usable solvent can be used without limitation in the constitution as long as it can dissolve the above-mentioned raw materials. Examples of the solvent may include water, ethanol, ethylene glycol, diethylene glycol, triethylene glycol, 1,4-butanediol, propylene glycol, ethylene glycol monobutyl ether, propylene glycol monomethyl ether, propylene glycol monomethyl ether acetate, methyl ethyl ketone, acetone, methyl amyl ketone, cyclohexanone, cyclopentanone, diethylene glycol monomethyl ether, diethylene glycol ethylether, toluene, xylene, butyrolactone, carbitol, methyl cellosolve acetate, N,N-dimethylacetamide, or a mixture thereof.

Further, the formation of the hydrogel polymer through polymerization of the monomer composition may be performed by a general polymerization method, and the process is not particularly limited. As a non-limiting example, the polymerization method are largely classified into a thermal polymerization and a photo-polymerization according to the type of the polymerization energy source, and the thermal polymerization may be carried out in a reactor like a kneader equipped with agitating spindles and the photo-polymerization may be carried out in a reactor equipped with a movable conveyor belt.

As an example, the monomer composition is injected into a reactor like a kneader equipped with the agitating spindles, and thermal polymerization can be performed by providing hot air thereto or heating the reactor, thereby obtaining the hydrogel polymer. In this case, the hydrogel polymer, which is discharged from the outlet of the reactor according to the type of agitating spindles equipped in the reactor, may be obtained as particles with a size of centimeters or millimeters. Specifically, the hydrogel polymer may be obtained in various forms according to the concentration of the monomer composition injected thereto, the injection speed, or the like, and the hydrogel polymer having a (weight average) particle diameter of 2 to 50 mm may be generally obtained.

As another example, when the photo-polymerization of the monomer composition is performed in a reactor equipped with a movable conveyor belt, a sheet-shaped hydrogel polymer may be obtained. In this case, the thickness of the sheet may vary depending on the concentration of the monomer composition injected thereto and the injection speed, and the polymer sheet is preferably controlled to have typically a thickness of 0.5 to 5 cm in order to secure the production speed or the like while enabling a uniform polymerization of the entire sheet.

In this case, the hydrogel polymer obtained by the above-mentioned method may have a water content of 40 to 80% by weight. Meanwhile, the "water content" as used herein means a weight occupied by moisture with respect to a total weight of the hydrogel polymer, which may be the value obtained by subtracting the weight of the dried polymer from the weight of the hydrogel polymer. Specifically, the water content can be defined as a value calculated by measuring the weight loss due to evaporation of moisture in the polymer in the drying process by raising the temperature of the polymer through infrared heating. At this time, the drying conditions may be determined as follows: the drying temperature is increased from room temperature to about 140° C. for 40 seconds and then the temperature may be maintained at 140° C., and the total drying time may be set to 10 minutes, including the temperature rising step.

Meanwhile, if necessary, after step 1, a step of coarsely pulverizing the prepared hydrogel polymer may be further included in order to increase the efficiency of the drying step of step 2 described later. A pulverizing machine used herein may include, but its configuration is not limited to, for example, any one selected from the group consisting of a vertical pulverizer, a turbo cutter, a turbo grinder, a rotary cutter mill, a cutter mill, a disc mill, a shred crusher, a crusher, a chopper, and a disc cutter. However, it is not limited to the above-described examples.

In this case, the coarse pulverizing step may be performed so that the hydrogel polymer has a particle diameter of about 2 mm to about 10 mm. Pulverizing the hydrogel polymer into a particle diameter of less than 2 mm is technically not easy due to a high water content of the hydrogel polymer, and a phenomenon of agglomeration may occur between the pulverized particles. Meanwhile, if the hydrogel polymer is pulverized into a particle diameter of larger than 10 mm, the effect of increasing the efficiency in the subsequent drying step may be insignificant.

(Step 2)

Step 2 is a step of drying the hydrogel polymer prepared in step 1, which is a step of preparing the pulverization of step 3 described below. In particular, the present disclosure is characterized in that the water content of the hydrogel polymer is 2 to 10 wt % through the drying.

Conventionally, it was dried so that the water content is low for pulverization as in step 3 described later, and generally, it was dried to have a water content of 1 wt % or less. However, when the water content is low, there is a problem that the generation of a fine powder is increased. Thus, in the present disclosure, the hydrogel polymer is dried to have a water content of 2 to 10 wt % so that the generation of fine powder is suppressed. When the water content is less than 2 wt %, there is a problem that the generation of fine powder during pulverization according to step 3 described later becomes high, and when the water content is more than 10 wt %, there is a problem in that the water content is too high and thus, the capability of expressing physical properties as a super absorbent polymer is lowered.

Preferably, the hydrogel polymer is dried to have a water content of 2.5 wt % or more, 3.0 wt % or more, 3.5 wt % or more, 4.0 wt % or more, or 4.5 wt % or more; and 9.5 wt % or less, 9.0 wt % or less, 8.5 wt % or less, or 8.0 wt % or less.

The drying can be carried out at a temperature of 90 to 195° C. When the drying temperature is less than 90° C., it is likely that the drying time becomes too long or the physical properties of the super absorbent polymer finally formed is deteriorated, and when the drying temperature is higher than 195° C., only the surface of the polymer is excessively dried, and thus it is likely that fine powder is generated during the subsequent pulverizing step, and the physical properties of the super absorbent polymer finally formed is deteriorated. More preferably, the drying is carried out at a temperature of 100° C. or more, and 190° C. or less, 180° C. or less, 170° C. or less, 160° C. or less, 150° C. or less, or 140° C. or less. Meanwhile, the drying time is not particularly limited as long as it can be dried to have the above-mentioned water content. However, the drying can be carried out for 20 minutes to 5 hours, in consideration of the process efficiency and the like, but it is not limited thereto.

In the drying step, the drying method may also be selected and used without being limited by its constitution if it is a method commonly used for drying the hydrogel polymer. Specifically, the drying step may be carried out by a method such as hot air supply, infrared irradiation, microwave irradiation or ultraviolet irradiation.

(Step 3)

Step 3 is a step of pulverizing the polymer dried in step 2 to prepare particles.

The polymer powder obtained after the pulverizing step may have a content of particles with a particle diameter of 150 to 850 μm of 90% or more. As a pulverizing device for pulverizing into such particle diameter, a ball mill, a pin mill, a hammer mill, a screw mill, a roll mill, a disc mill or a jog mill, etc. may be used, but the pulverizing device is not limited to the above-mentioned examples.

As described in step 2 above, since the water content of the polymer prepared in step 2 is high, it exhibits an effect of lowering the fine powder content during pulverization through step 3. As in Examples and Comparative Examples described later, it can be confirmed that there is a difference in the fine powder content according to the water content. In particular, when having the same water content as in the present disclosure, it can be confirmed that the generation of a fine powder is reduced.

Meanwhile, in order to control the physical properties of the super absorbent polymer powder finally commercialized after the pulverization step, a separate step of classifying the polymer powder obtained after the pulverization depending on the particle diameter may be undergone. Preferably, particles having a particle diameter of 150 μm to 850 μm, or 180 μm to 850 μm are classified and can be used for a super absorbent polymer.

(Other Step)

In addition, the present disclosure may include a step of crosslinking the surface of the prepared particles, if necessary. Specifically, it may further include a step of heat-treating and surface-crosslinking the prepared particles in the presence of a surface crosslinking solution.

The surface crosslinking solution may include any one or more surface crosslinking agents selected from the group consisting of compounds having two or more epoxy rings, and compounds having two or more hydroxy groups.

Preferably, the surface crosslinking solution includes both compounds having two or more epoxy rings and compounds having two or more hydroxy groups. In this case, the surface crosslinking solution includes a compound having two or more epoxy rings and a compound having two or more hydroxy groups in a ratio of 1:1.1 to 1:5.

Examples of the compound having two or more epoxy rings include one or more compounds selected from the group consisting of ethylene glycol diglycidyl ether, polyethylene glycol diglycidyl ether, glycerol polyglycidyl ether, propylene glycol diglycidyl ether, polypropylene glycol diglycidyl ether, 1,4-butanediol diglycidyl ether, 1,4-cyclohexanedimethanol diglycidyl ether, hexahydrophthalic anhydride diglycidyl ether, neopentyl glycol diglycidyl ether, bisphenol A diglycidyl ether, and N,N-diglycidylaniline. Preferably, ethylene glycol diglycidyl ether is used.

Examples of the compound having two or more hydroxy groups include one or more compounds selected from the group consisting of ethylene glycol, diethylene glycol, propylene glycol, triethylene glycol, tetraethylene glycol, propane diol, dipropylene glycol, polypropylene glycol, glycerin, polyglycerin, butanediol, heptanediol, hexanediol, trimethylolpropane, pentaerythritol, and sorbitol. Preferably, propylene glycol is used.

In this case, the surface crosslinking agent is preferably used in an amount of 1 part by weight or less based on 100 parts by weight of the base resin. Here, the amount of the surface crosslinking agent used refers to the total amount of the surface cross-linking agents when two or more of the surface crosslinking agents are used. When the amount of the surface crosslinking agent used is more than 1 part by weight, excessive surface crosslinking may proceed and various physical properties, particularly dryness, of the super absorbent polymer may be deteriorated. In addition, the surface crosslinking agent is preferably used in an amount of 0.01 parts by weight or more, 0.02 parts by weight or more, 0.03 parts by weight or more, 0.04 parts by weight or more, or 0.05 parts by weight or more based on 100 parts by weight of the base polymer.

Moreover, the surface crosslinking solution may further include at least one solvent selected from the group consisting of water, ethanol, ethylene glycol, diethylene glycol, triethylene glycol, 1,4-butanediol, propylene glycol, ethylene glycol monobutyl ether, propylene glycol monomethyl ether, propylene glycol monomethyl ether acetate, methyl ethyl ketone, acetone, methyl amyl ketone, cyclohexanone, cyclopentanone, diethylene glycol monomethyl ether, diethylene glycol ethylether, toluene, xylene, butyrolactone, carbitol, methyl cellosolve acetate and N,N-dimethylacetamide. Preferably, water is used. The solvent can be used in an amount of 0.5 to 10 parts by weight based on 100 parts by weight of the base polymer powder.

Furthermore, the surface crosslinking solution may further include aluminum sulfate. The aluminum sulfate may be contained in an amount of 0.02 to 0.3 parts by weight based on 100 parts by weight of the base polymer powder.

Further, the surface crosslinking solution may further include an inorganic filler. The inorganic filler may include silica, aluminum oxide, or silicate. The inorganic filler may be contained in an amount of 0.01 to 0.5 parts by weight based on 100 parts by weight of the base polymer powder.

Further, the surface crosslinking solution may further include a thickener. If the surface of the base polymer powder is further crosslinked in the presence of the thickener in this way, it is possible to minimize the deterioration of the physical properties even after the pulverization. Specifically, as the thickener, at least one selected from a polysaccharide and a hydroxy-containing polymer may be used. The polysaccharide may be a gum type thickener, a cellulose type thickener and the like. Specific examples of the gum type thickener include xanthan gum, arabic gum, karaya gum, tragacanth gum, ghatti gum, guar gum, locust bean gum, and psyllium seed gum. Specific examples of the cellulose type thickener include hydroxypropylmethyl cellulose, carboxymethyl cellulose, methylcellulose, hydroxymethyl cellulose, hydroxyethyl cellulose, hydroxypropyl cellulose, hydroxyethylmethyl cellulose, hydroxymethylpropyl cellulose, hydroxyethylhydroxypropyl cellulose, ethylhydroxyethyl cellulose, and methylhydroxypropyl cellulose. Meanwhile, specific examples of the hydroxy-containing polymer include polyethylene glycol, polyvinyl alcohol and the like.

Meanwhile, in order to perform the surface crosslinking, a method of placing the surface crosslinking solution and the base polymer into a reaction tank and mixing them, a method of spraying a surface crosslinking solution onto the base polymer, a method in which the base polymer and the surface crosslinking solution are continuously supplied in a continuously operating mixer and mixed, or the like can be used.

Further, the surface crosslinking may be carried out at a temperature of 100 to 160° C. The surface crosslinking temperature affects various physical properties of the finally produced super absorbent polymer. Specifically, when the surface crosslinking temperature is less than 120° C., the surface crosslinking does not sufficiently proceed, so the degree of improvement in physical properties of the super absorbent polymer is insignificant. When the surface crosslinking temperature is higher than 160° C., excessive surface crosslinking may proceed, and thus, the polymer particles are damaged and the physical properties may be deteriorated.

According to Examples and Comparative Examples described later, the physical property improvement of the super absorbent polymer proceeds only when the surface crosslinking temperature satisfies the above range. When the above range is not satisfied, a phenomenon in which the physical properties of the super absorbent polymer are deteriorated has occurred. More preferably, the surface crosslinking temperature is 125° C. or higher, 130° C. or higher, or 135° C. or higher, and 155° C. or lower, 150° C. or lower, or 145° C. or lower.

Further, the surface crosslinking may be carried out for 1 to 120 minutes, or 1 to 100 minutes, or 10 to 60 minutes. That is, in order to prevent a reduction in physical properties due to damages of the polymer particles by excessive reaction even while inducing the minimal surface crosslinking reaction, the surface modification step may be performed under the above-described conditions.

Advantageous Effects

As described above, the method for producing a super absorbent polymer according to the present disclosure has a feature that it is possible to reduce the generation of a fine powder while maintaining excellent physical properties of the super absorbent polymer.

DETAILED DESCRIPTION OF THE EMBODIMENTS

Hereinafter, preferred examples are provided for better understanding of the invention. However, these Examples are given for illustrative purposes only and are not intended to limit the scope of the present disclosure thereto.

Evaluation Method

The particles prepared in the following Examples and Comparative Examples were analyzed as follows.

(1) Particle Diameter Distribution

Particles classified according to particle diameter were re-classified into #20 to #30 (particle diameter of 850 to 600 μm), #30 to #50 (particle diameter of 600 to 300 μm), #50 to 80 (particle diameter of 300 to 180 μm), and less than #80 (particle diameter of less than 180 μm), and the weight of each classified particle was measured. Then, the following (2) to (6) were evaluated for particles of #30 to #50 (particle diameter of 600 to 300 μm).

(2) Water Content

After measuring the weight of the particles, the temperature was increased from room temperature to 140° C. for 40 seconds, and then the temperature was maintained at 140° C. The total drying time was set to 10 minutes, including the temperature rising step, and dried. Then, the weight of the particles was measured again, and the amount of reduction in the particles relative to the particle weight measured previously was measured as the water content.

(3) CRC

The centrifuge retention capacity (CRC) by water absorption capacity under a non-loading condition was measured for the super absorbent polymers of Examples and Comparative Examples in accordance with EDANA (European Disposables and Nonwovens Association) recommended test method No. WSP 241.3.

Specifically, $W_0$ (g, about 0.2 g) of the particles were uniformly put in a nonwoven fabric-made bag, followed by sealing. Then, the bag was immersed in a physiological saline solution composed of 0.9 wt % aqueous sodium chloride solution at room temperature. After 30 minutes, water was removed from the bag by centrifugation at 250 G for 3 minutes, and the weight $W_2$ (g) of the bag was then measured. Further, the same procedure was carried out without using the particles, and then the resultant weight $W_1$ (g) was measured.

Using the respective weights thus obtained, CRC (g/g) was calculated according to the following Mathematical Formula 1.

$$CRC(g/g) = \{[W_2(g) - W_1(g) - W_0(g)]/W_0(g)\} \quad \text{[Mathematical Formula 1]}$$

in the Mathematical Formula 1, $W_0$ (g) is an initial weight (g) of the particles, $W_1$ (g) is the weight of the device not including the particles, measured after immersing and absorbing the same into a physiological saline solution for 30 minutes and then dehydrating the same by using a centrifuge at 250 G for 3 minutes, and $W_2$ (g) is the weight of the device including the particles, measured after immersing and absorbing the particles into a physiological saline solution at room temperature for 30 minutes and then dehydrating the same by using a centrifuge at 250 G for 3 minutes.

(4) BPI (Base Polymer Index)

The extractable contents (E/C; unit: wt %) of the particles were measured in accordance with EDANA recommended test method No. WSP 270.2, and BPI was calculated from the previously measured CRC value according to the following Mathematical Formula 2.

$$BPI = (CRC + 8.7585)/\ln(E/C) \quad \text{[Mathematical Formula 2]}$$

(5) Vortex 50 mL of a 0.9 wt % NaCl solution was put in a 100 mL beaker, and then 2 g of each particle was added thereto while stirring at 600 rpm using a stirrer. Then, the vortex time was calculated by measuring the amount of time until a vortex of the liquid caused by the stirring disappeared and a smooth surface was formed, and the result was shown as the vortex removal time.

(6) Bulk Density (B/D)

100 g of the particles were flowed through a standard fluidity measuring device orifice and received in a container with a volume of 100 ml, the particles were cut so as to be horizontal, and the volume of the particles was adjusted to 100 ml. Then, the weight of only the particles excluding the container was measured. The weight of only the particles was then divided by 100 ml, which is the volume of the particles, to obtain the bulk density corresponding to the weight of the particles per unit volume.

(7) Residual Monomers (RM)

The concentration of residual monomers was measured in accordance with EDANA recommended test method No. WSP 210.3. Specifically, 1.000 g of the particles and 200 g of 0.9% brine were placed in a 250 mL Erlenmeyer flask and stirred for 1 hour. Subsequently, the resulting mixture was filtered using filter paper, and the solution was sampled and measured by HPLC.

(8) Absorbency Under Pressure (0.3 AUP)

The absorbency under pressure (AUP) of the super absorbent polymers of Examples and Comparative Examples was measured in accordance with EDANA (European Disposables and Nonwovens Association) recommended test method No. WSP 242.3.

Specifically, a 400 mesh stainless screen was installed at the bottom of a plastic cylinder having an inner diameter of 60 mm. $W_0$(g, 0.90 g) of the super absorbent polymers obtained in Examples and Comparative Examples were uniformly scattered on the stainless screen under a condition of a temperature of 23±2° C. and a relative humidity of 45%. Then, a piston capable of further providing a load of 0.3 psi uniformly was designed so that the outer diameter was slightly smaller than 60 mm and thus it could move freely up and down without any gap with the inner wall of the cylinder. At this time, the weight $W_4$ (g) of the device was measured.

A glass filter having a diameter of 125 mm and a thickness of 5 mm was placed in a Petri dish having a diameter of 150 mm, and a physiological saline solution composed of 0.90 wt % sodium chloride was poured until the surface level became equal to the upper surface of the glass filter. Then, a sheet of filter paper having a diameter of 120 mm was placed on the glass filter. The measuring device was placed on the filter paper, so that the liquid was absorbed under load for one hour. After one hour, the measuring device was lifted and the weight $W_3$ (g) was measured.

Using the respective weights thus obtained, AUP (g/g) was calculated according to the following Mathematical Formula 3.

$$\text{AUP(g/g)} = [W_4 (g) - W_3 (g)] / W_0 (g) \quad \text{[Mathematical Formula 3]}$$

in the Mathematical Formula 3, $W_0$ (g) is an initial weight (g) of the super absorbent polymer, $W_4$ (g) is the total sum of a weight of the super absorbent polymer and a weight of the device capable of providing a load to the super absorbent polymer, and $W_3$ (g) is the total sum of a weight of the super absorbent polymer and a weight of the device capable of providing a load to the super absorbent polymer, after absorbing a physiological saline solution to the super absorbent polymer under a load (0.3 psi) for 1 hour.

(9) EFFC

It was calculated by the average value of the CRC value and AUP value measured above.

Preparation Example: Preparation of Encapsulated Foaming

Agent

An encapsulated foaming agent was prepared having a core-shell structure, the core being iso-pentane and the shell being formed of a copolymer of acrylate and acrylonitrile. The iso-pentane was included in an amount of 20 wt % based on the total weight of the encapsulated foaming agent. The diameter of each encapsulated foaming agent was measured as the average Feret diameter through an optical microscope. The average diameter of the encapsulated foaming agent was determined and defined as the average diameter of the encapsulated foaming agent. 0.2 g of an encapsulated foaming agent was coated onto a glass Petri dish, and then left on a hot plate preheated to 150° C. for 10 minutes. The encapsulated foaming agent was gradually expanded by heat, and this was observed with an optical microscope, and the maximum expansion ratio and the maximum expansion size of the encapsulated foaming agent in air were measured. After heat was applied to the encapsulated foaming agent, the diameter of the top 10 wt % was measured in the order of many expanded particles and defined as the maximum expansion size. The ratio (DM/D0) of the average diameter (DM) of the top 10 wt % of many expanded particles after applying heat to the average diameter (Do) measured before applying heat to the encapsulated foaming agent was determined and defined as the maximum expansion ratio. The average diameter of the encapsulated foaming agent was 40 μm, the maximum expansion ratio of the encapsulated foaming agent in air was about 12 times, and the maximum expansion size was about 400 to 540 μm.

Example 1-1

(Step 1)

609.8 g of NaOH (31.5 wt %) and 229.1 g of water were placed in a double-jacketed glass reactor and cooled to 20° C. while stirring with a magnetic stirrer to prepare a solution A. 0.3 g of PEGDA solution (polyethyleneglycol diacrylate, weight average molecular weight=400, 2 wt % in AA (acrylic acid)), 18.8 g of phenylbis(2,4,6-trimethylbenzoyl) phosphine oxide solution (0.21 wt % in AA) as a photoinitiator, and 474.9 g of AA (acrylic acid) were placed in a double-jacket neutralizing tank equipped with a forced-vortex impeller, and stirred at 300 rpm to prepare a solution B. The solution A was mixed while charging into a neutralization tank containing the solution B using a pump. The temperature of the neutralization solution, which was raised to about 65° C. by the heat generated while AA and NaOH were neutralizing, was cooled up to 50° C. while the refrigerant cooled to 20° C. by a cooling circulator was circulated through the outer jacket of the double-jacketed reactor. At this time, 6.4 g of EGDE (ethylene glycol diglycidyl ether) solution (10 wt % in $H_2O$) as the previously prepared internal crosslinking agent was charged into the neutralization solution. In a moving container containing 24.7 g of SPS (sodium persulfate) solution (4 wt % in $H_2O$), 1.4 g of SDS (sodium dodecylsulfate) solution (2 wt % in $H_2O$), and 34.6 g of the previously prepared encapsulated foaming agent (2 wt % in $H_2O$), the neutralization solution cooled to 48° C. was drained and mixed. At this time, the TSC (total solid content) of the monomer solution was 43 wt %, and the neutralization degree was 70 mol %. This monomer solution was poured into a stainless container (bottom 25 cm×25 cm, top 35 cm×35 cm, and height 10 cm) where a silicone sheet was placed in the oven heated to 80° C. The thickness of the monomer solution poured on the container was about 2.5 cm. And, polymerization was performed by irradiating ultraviolet rays using a UV lamp. Foaming started 27 seconds after UV irradiation, and the maximum foaming thickness was about 6 cm. After irradiating with ultraviolet rays for 60 seconds, it was aged in an oven at 80° C. for 120 seconds, and then the obtained polymerization sheet was taken out. The obtained polymerization sheet had a thickness of about 2 to 3 cm.

(Step 2)

The prepared polymerization sheet was cut into four equal parts using scissors, and 200 g of water was added thereto and mixed uniformly. This was charged into a chopper equipped with a hole plate having a hole size of 16 mm and discharged while being pressed at a rate of 35 Hz to obtain a crumb. The obtained crumb was dried by hot air at 135° C. for 39 minutes.

(Step 3)

The dried polymer was pulverized using a cutting mill (pulverisette 19, Fritsch, lower mesh size: 10 mm) and a roll mill (Modern Process Equipment Corporation, 0.3/0.15 mm). Then, the prepared particles were classified (#4/6/10/25/30/40/50/80/100 mesh), and only #25 or higher was re-charged into a two-stage roll mill (Modern Process Equipment Corporation, 0.3/0.15 mm), re-pulverized, combined with the previously prepared particles, and then classified (#20/30/40/50/80/100 mesh). The size distribution and properties, etc. of each prepared particle are shown in Table 1 below.

Example 1-2

It was prepared in the same manner as in Example 1-1, but in step 1 of Example 1-1, 4.9 g of EGDE solution (10 wt % in $H_2O$) and 24.7 g of SPS (sodium persulfate) solution (4 wt % in $H_2O$) were used, and in step 2 of Example 1-1, the obtained crumb was dried by hot air at 115° C. for 39 minutes, thereby preparing particles.

Example 1-3

It was prepared in the same manner as in Example 1-1, but in step 1 of Example 1-1, 4.0 g of EGDE solution (10 wt % in $H_2O$) and 30.9 g of SPS (sodium persulfate) solution (4 wt % in $H_2O$) were used, and in step 2 of Example 1-1, the obtained crumb was dried by hot air at 100° C. for 39 minutes, thereby preparing particles.

Comparative Example 1-1

It was prepared in the same manner as in Example 1-1, but in step 1 of Example 1-1, 12.4 g of EGDE solution (10 wt % in $H_2O$) and 11.1 g of SPS (sodium persulfate) solution (4 wt % in $H_2O$) were used, and in step 2 of Example 1-1, the obtained crumb was dried by hot air at 195° C. for 39 minutes, thereby preparing particles.

Comparative Example 1-2

It was prepared in the same manner as in Example 1-1, except that in step 1 of Example 1-1, 12.4 g of EGDE solution (10 wt % in $H_2O$) and 11.1 g of SPS (sodium persulfate) solution (4 wt % in $H_2O$) were used, and in step 2 of Example 1-1, the obtained crumb was dried by hot air at 135° C. for 39 minutes, thereby preparing particles.

The physical properties of the particles prepared in Examples 1-1 to 1-3 and Comparative Examples 1-1 and 1-2 were evaluated, and the results are shown in Table 1 below.

TABLE 1

| | | Unit | Comparative Example 1-1 | Comparative Example 1-2 | Example 1-1 | Example 1-2 | Example 1-3 |
|---|---|---|---|---|---|---|---|
| Process condition | Drying temperature | ° C. | 195 | 135 | 135 | 115 | 110 |
| | EDGE | ppmw[1] | 2500 | 2500 | 1300 | 1000 | 800 |
| Water content | | wt % | 0.8 | 2.5 | 3.0 | 5.5 | 7.9 |
| Particle diameter distribution | #20-30 | wt %[2] | 8.0 | 8.3 | 8.1 | 11.0 | 16.4 |
| | #30-50 | wt %[2] | 72.6 | 72.2 | 72.5 | 70.6 | 67.0 |
| | #50-80 | wt %[2] | 19.4 | 19.5 | 19.3 | 18.5 | 16.7 |
| | Less than #80 | wt %[3] | 17.9 | 17.3 | 17.5 | 15.3 | 10.9 |
| Physical properties | CRC | g/g | 34.9 | 30.4 | 35.5 | 36.4 | 36.5 |
| | BPI | — | 22.6 | 35.6 | 22.6 | 22.3 | 21.9 |
| | Vortex | second | 49 | 41 | 40 | 36 | 32 |
| | B/D | g/ml | 0.49 | 0.50 | 0.51 | 0.50 | 0.49 |

[1]Use amount relative to the total weight of acrylic acid used for polymerization
[2]Content relative to the total weight of #20-80 particles
[3]Content relative to the prepared total particles Comparing Examples 1-1 to 1-3 with Comparative Example 1-1, there is no significant difference in terms of physical properties of the particles, but it can be confirmed that in the Examples according to the present disclosure, the generation amount of fine powder is significantly reduced. Therefore, it can be confirmed that the generation of fine powder can be reduced while implementing the existing physical properties. In addition, comparing Examples 1-1 to 1-3 with Comparative Example 1-2, it can be confirmed that when only the water content is increased to the level of the Examples, without adjusting the internal crosslinking agent, the CRC is significantly reduced. Therefore, it was confirmed that the internal crosslinking agent had to be adjusted when the water content was increased.

Example 2-1

Particles were prepared in the same manner as in Example 1-1.

Examples 2-2 to 2-4

Particles were prepared in the same manner as in Example 1-1, except that the amount of the previously prepared encapsulated foaming agent used was changed as shown in Table 2 below.

Comparative Example 2-1

It was prepared in the same manner as in Example 1-1, but in step 1 of Example 1-1, the use amount of EGDE as the internal crosslinking agent and the use amount of the previously prepared encapsulated foaming agent were changed as shown in Table 2 below, and in step 2 of Example 1-1, the obtained crumb was dried by hot air at 195° C. for 39 minutes, thereby preparing particles.

The physical properties of the particles prepared in Examples 2-1 to 2-4 and Comparative Example 2-1 were evaluated, and the results are shown in Table 2 below.

TABLE 2

| | | Unit | Example 2-1 | Example 2-2 | Example 2-3 | Example 2-4 | Comparative Example 2-1 |
|---|---|---|---|---|---|---|---|
| Process condition | EDGE | ppmw[4] | 1300 | 1300 | 1300 | 1300 | 2500 |
| | Foaming agent | ppmw[4] | 1400 | 1000 | 600 | 200 | 1400 |
| | Drying temperature | °C. | 135 | 135 | 135 | 135 | 195 |
| Water content | | wt % | 3.0 | 4.0 | 4.1 | 5.3 | 0.8 |
| Particle diameter distribution | #20-30 | wt %[5] | 8.1 | 8.2 | 8.3 | 8.4 | 8.0 |
| | #30-50 | wt %[5] | 72.5 | 73.3 | 73.2 | 73.5 | 72.6 |
| | #50-80 | wt %[5] | 19.3 | 18.5 | 18.5 | 18.1 | 19.4 |
| | Less than #80 | wt %[6] | 17.5 | 15.7 | 15.7 | 13.1 | 17.9 |
| Physical properties | CRC | g/g | 35.5 | 36.6 | 37.2 | 36.7 | 34.9 |
| | BPI | | 22.6 | 22.5 | 23.1 | 22.6 | 22.6 |
| | Vortex | sec | 40 | 41 | 44 | 46 | 49 |
| | B/D | g/ml | 0.51 | 0.52 | 0.55 | 0.58 | 0.49 |
| | RM | ppm | 1040 | 770 | 540 | 390 | 950 |

[4])Use amount relative to the total weight of acrylic acid used for polymerization
[5])Content relative to the total weight of #20-80 particles
[6])Content relative to the prepared total particles Comparing Examples 2-1 to 2-4 with Comparative Example 2-1, it can be confirmed that in Examples according to the present disclosure, the generation amount of fine powder is significantly reduced. In addition, it can be confirmed that Example 2-1 has a similar level of physical properties as Comparative Example 2-1, and Examples 2-2 to 2-4 have many parts of which are improved in physical properties as compared with Comparative Example 2-1.

Example 3-1

(Step 1)

610.1 g of NaOH (31.5 wt %) and 246.9 g of water were placed in a double-jacketed glass reactor and cooled to 20° C. while stirring with a magnetic stirrer to prepare a solution A. 0.3 g of PEGDA solution (polyethyleneglycol diacrylate, weight average molecular weight=400, 2 wt % in AA (acrylic acid)), 18.8 g of phenylbis(2,4,6-trimethylbenzoyl) phosphine oxide solution (0.21 wt % in AA) as a photoinitiator, and 475.1 g of AA (acrylic acid) were placed in a double-jacket neutralizing tank equipped with a forced-vortex impeller, and stirred at 300 rpm to prepare a solution B. The solution A was mixed while charging into a neutralization tank containing the solution B using a pump. The temperature of the neutralization solution, which was raised to about 65° C. by the heat generated while AA and NaOH were neutralizing, was cooled up to 50° C. while the refrigerant cooled to 20° C. by a cooling circulator was circulated through the outer jacket of the double-jacketed reactor. At this time, 7.9 g of EGDE (ethylene glycol diglycidyl ether) solution (10 wt % in $H_2O$) as the previously prepared internal crosslinking agent was charged into the neutralization solution. In a moving container containing 24.7 g of SPS (sodium persulfate) solution (4 wt % in $H_2O$), 1.4 g of SDS (sodium dodecylsulfate) solution (2 wt % in $H_2O$), and 14.8 g of the previously prepared encapsulated foaming agent (2 wt % in $H_2O$), the neutralization solution cooled to 48° C. was drained and mixed. At this time, the TSC (total solid content) of the monomer solution was 43 wt %, and the neutralization degree was 70 mol %. This monomer solution was poured into a stainless container (bottom 25 cm×25 cm, top 35 cm×35 cm, and height 10 cm) where a silicone sheet was placed in the oven heated to 80° C. The thickness of the monomer solution poured on the container was about 2.5 cm. And, polymerization was performed by irradiating ultraviolet rays using a UV lamp. Foaming started 27 seconds after UV irradiation, and the maximum foaming thickness was about 6 cm. After irradiating with ultraviolet rays for 60 seconds, it was aged in an oven at 80° C. for 120 seconds, and then the obtained polymerization sheet was taken out. The obtained polymerization sheet had a thickness of about 2 to 3 cm.

(Step 2)

The prepared polymerization sheet was cut into four equal parts using scissors, and 200 g of water was added thereto and mixed uniformly. This was charged into a chopper equipped with a hole plate having a hole size of 11 mm and discharged while being pressed at a rate of 35 Hz to obtain a crumb. The obtained crumb was dried by hot air at 135° C. for 39 minutes.

(Step 3)

The dried polymer was pulverized using a cutting mill (pulverisette 19, Fritsch, lower mesh size: 10 mm) and a roll mill (Modern Process Equipment Corporation, 0.3/0.15 mm). Then, the prepared particles were classified (#4/6/10/25/30/40/50/80/100 mesh), and only #25 or higher was re-charged into a two-stage roll mill (Modern Process Equipment Corporation, 0.3/0.15 mm), re-pulverized, combined with the previously prepared particles, and then classified (#20/30/40/50/80/100 mesh). At this time, the prepared particles were named "B/R particles", and the size distribution and properties of each prepared particle are shown in Table 3 below.

(Step 4)

Water, $Na_2S_2O_5$, PEG-6K (poly(ethylene glycol), Mn=6,000), EGDE (Ethylene glycol diglycidyl ether), methanol, glycerol monostearate, AEROXIDE® Alu 130 (Evonik), and 23% Al2504 aqueous solution were mixed at a weight ratio of 6.2:0.05:0.025:0.03:6.2:0.03:0.1:0.87, respectively, to prepare 13.5 g of a surface crosslinking solution.

150 g of the B/R particles prepared in step 3 was placed in a high-speed mixer, 13.5 g of the surface crosslinking solution was sprayed while mixing at 200 rpm, the reaction was carried out at 140° C. for 35 minutes, and the reaction product was cooled to room temperature, thereby obtaining a super absorbent polymer.

(Step 5)

Based on 100 parts by weight of the superabsorbent polymer obtained in step 4, 0.1 parts by weight of Aerosil 200 and 0.05 parts by weight of 2-hydroxy-2-sulfonate acetic acid disodium salt were mixed. The size distribution, properties, etc. of the final produced particles are shown in Table 5 below. The size distribution, properties, etc. of the final produced particles are shown in Table 4 below.

Example 3-2

It was prepared in the same manner as in Example 3-1, but in step 1 of Example 3-1, the use amount of EGDE solution as the internal crosslinking agent and the use amount of the encapsulated foaming agent were changed as shown in Table 3 below, and in step 2 of Example 3-1, the diameter of the hole in the chopper equipped with a hole plate was changed, and step 5 of Example 3-1 was omitted, thereby preparing a super absorbent polymer. The size distribution, properties, etc. of the prepared particles are shown in Table 4 below.

Comparative Example 3-1

(Steps 1 to 3)
It was prepared in the same manner as in steps 1 to 3 of Example 3-1, but in step 1 of Example 3-1, the use amount of EGDE solution as the internal crosslinking agent and the use amount of the encapsulated foaming agent were changed as shown in Table 4 below, and in step 2 of Example 3-1, the diameter of the hole in the chopper equipped with a hole plate and the drying temperature of the obtained crumb were changed as shown in Table 3 below, thereby preparing B/R particles.

(Steps 4 and 5)
A superabsorbent polymer was prepared in the same manner as in step 4 and step 5 of Example 3-1, except that the B/R particles prepared above were used. The size distribution, properties, etc., of the prepared particles are shown in Table 4 below.

Comparative Example 3-2

A super absorbent polymer was prepared in the same manner as in Example 3-1, except that the surface crosslinking temperature in step 4 of Example 3-1 was changed to 120° C. The size distribution, properties, etc., of the prepared particles are shown in Table 4 below.

Comparative Example 3-3

"B/R particles" were prepared in the same manner as steps 1 to 3 of Comparative Example 3-1, and a super absorbent polymer was prepared in the same manner as in step 4 of Example 3-1 by using the particles. At this time, step 5 of Example 3-1 was not applied. The size distribution, properties, etc., of the prepared particles are shown in Table 4 below.

The results of Examples 3-1 and 3-2 and Comparative Example 3-1 are shown in Table 3 (B/R particles) below.

TABLE 3

| | | Unit | Example 3-1 (B/R) | Example 3-2 (B/R) | Comparative Example 3-1 (B/R) |
|---|---|---|---|---|---|
| Process condition | EDGE | ppmw[7] | 1600 | 1300 | 2500 |
| | Foaming agent | ppmw[7] | 600 | 1400 | 1400 |
| | Drying temperature | ° C. | 135 | 135 | 195 |
| | Diameter of hole | Mm | 11 | 16 | 16 |
| Water content | | wt % | 3.1 | 3.4 | 0.8 |
| Particle diameter distribution | #20-30 | wt %[8] | 8.1 | 8.0 | 8.0 |
| | #30-50 | wt %[8] | 74.1 | 71.3 | 72.6 |
| | #50-80 | wt %[8] | 17.8 | 20.6 | 19.4 |
| | Less than #80 | wt %[9] | 14.1 | 18.4 | 17.9 |
| Physical properties | CRC | g/g | 35.3 | 35.7 | 34.9 |
| | BPI | | 23.6 | 22.8 | 22.6 |
| | Vortex | sec | 44 | 42 | 49 |
| | B/D | g/ml | 0.55 | 0.52 | 0.49 |
| | RM | ppm | 1050 | 911 | 949 |

[7]Use amount relative to the total weight of acrylic acid used for polymerization
[8]Content relative to the total weight of #20-80 particles
[9]Content relative to the prepared total particles Comparing Examples 3-1 and 3-2 with Comparative Example 3-1, it can be confirmed that in Examples according to the present disclosure, the generation amount of fine powder is significantly reduced and also that there are many parts of which are improved in physical properties.

The results of Examples 3-1 and 3-2 and Comparative Example 3-1 are shown in Table 4 (superabsorbent polymer particles) below.

TABLE 4

| | | Unit | Example 3-1 | Example 3-2 | Comparative Example 3-1 | Comparative Example 3-2 | Comparative Example 3-3 |
|---|---|---|---|---|---|---|---|
| Surface crosslinking condition | Temperature | ° C. | 140 | 140 | 140 | 120 | 140 |
| | Time | min | 35 | 35 | 35 | 35 | 35 |

TABLE 4-continued

| | Unit | Example 3-1 | Example 3-2 | Comparative Example 3-1 | Comparative Example 3-2 | Comparative Example 3-3 |
|---|---|---|---|---|---|---|
| Particle diameter distribution | #20-30 | wt % | 19.8 | 25.9 | 18.4 | 20.5 | 21.3 |
| | #30-50 | wt % | 68.5 | 63.3 | 68.8 | 67.8 | 67.4 |
| | #50-80 | wt % | 11.7 | 10.8 | 12.9 | 11.7 | 11.3 |
| Physical properties | CRC | g/g | 33.7 | 33.9 | 33.4 | 33.5 | 33.4 |
| | 0.3 AUP | g/g | 28.2 | 30.4 | 27.5 | 26.8 | 30.8 |
| | EFFC | g/g | 31.0 | 32.2 | 30.5 | 30.2 | 32.1 |
| | Vortex | sec | 36 | 39 | 35 | 32 | 39 |
| | Water content | wt % | 1.53 | 1.07 | 1.01 | 1.56 | 0.64 |
| | B/D | g/ml | 0.52 | 0.47 | 0.49 | 0.52 | 0.47 |

Comparing Examples 3-1 and 3-2 with Comparative Examples 3-1 to 3-3, it can be confirmed that similar to the results for the B/R particles, the Examples according to the present disclosure have many parts of which are improved in physical properties. In particular, it can be confirmed that there are significantly more parts of which are improved in physical properties, as compared with Comparative Example 3-2 in which the surface crosslinking temperature is low.

The invention claimed is:

1. A method for preparing a super absorbent polymer comprising:
    performing crosslinking polymerization of a water-soluble ethylenically unsaturated monomer having an acidic group of which at least a part is neutralized, in the presence of an internal crosslinking agent and a polymerization initiator to form a hydrogel polymer containing a first crosslinked polymer;
    drying the hydrogel polymer so that a water content of the polymer is 2 to 10 wt %; and
    pulverizing the dried polymer to prepare particles,
    wherein the internal crosslinking agent is used in an amount of 500 to 2500 ppmw based on a weight of the water-soluble ethylenically unsaturated monomer having an acidic group of which at least a part is neutralized,
    wherein the crosslinking polymerization is performed in the presence of a foaming agent, and
    wherein the foaming agent is an encapsulated foaming agent, which has a structure including a core containing hydrocarbon and a shell surrounding the core and formed of a thermoplastic resin.

2. The method of claim 1,
    wherein the internal crosslinking agent is ethylene glycol diglycidyl ether, N,N'-methylenebisacrylamide, trimethylolpropane tri(meth)acrylate, polyethylene glycol diacrylate, ethylene glycol di(meth)acrylate, polyethylene glycol(meth)acrylate, polyethylene glycol di(meth)acrylate, polypropylene glycol (meth)acrylate, butanediol di(meth)acrylate, butylene glycol di(meth)acrylate, diethylene glycol di(meth)acrylate, hexanediol di(meth)acrylate, triethylene glycol di(meth)acrylate, tripropylene glycol di(meth)acrylate, tetraethylene glycol di(meth)acrylate, dipentaerythritol pentacrylate, glycerin tri(meth)acrylate, pentaerythritol tetraacrylate, triarylamine, propylene glycol, glycerin, or ethylene carbonate.

3. The method of claim 1,
    wherein the internal crosslinking agent is used in an amount of 800 to 2000 ppmw, based on the weight of the water-soluble ethylenically unsaturated monomer having an acidic group in which at least a portion is neutralized.

4. The method of claim 1,
    wherein the encapsulated foaming agent has an average diameter of 5 to 50 μm.

5. The method of claim 1,
    wherein the drying the hydrogel polymer is performed at a temperature of 90 to 195° C.

6. The method of claim 1,
    wherein the drying the hydrogel polymer is performed at a temperature of 100 to 140° C.

7. The method of claim 1,
    wherein the particles are classified into particles having a particle diameter of 150 μm to 850 μm.

8. The method of claim 1,
    further comprising crosslinking the surface of the particles.

9. The method of claim 8,
    wherein the surface crosslinking is performed at a temperature of 120 to 160° C.

10. The method of claim 8,
    wherein the surface crosslinking is performed at a temperature of 135 to 145° C.

11. A method for preparing a super absorbent polymer, comprising:
    performing crosslinking polymerization of a water-soluble ethylenically unsaturated monomer having an acidic group of which at least a part is neutralized, in the presence of an internal crosslinking agent and a polymerization initiator to form a hydrogel polymer containing a first crosslinked polymer;
    drying the hydrogel polymer so that a water content of the polymer is 2 to 10 wt %; and
    pulverizing the dried polymer to prepare particles,
    wherein the internal crosslinking agent is used in an amount of 500 to 2500 ppmw based on a weight of the water-soluble ethylenically unsaturated monomer having an acidic group of which at least a part is neutralized, further comprising crosslinking the surface of the particles, and wherein the surface crosslinking is performed at a temperature of 120 to 160° C.

12. The method of claim 1,
    wherein the foaming agent is used in an amount of 100 to 1500 ppmw based on the weight of the water-soluble ethylenically unsaturated monomer having an acidic group of which at least a part is neutralized.

* * * * *